(12) United States Patent
Shoji et al.

(10) Patent No.: US 7,591,647 B2
(45) Date of Patent: Sep. 22, 2009

(54) SUPPORT STRUCTURE

(75) Inventors: Tadashi Shoji, Yokosuka (JP); Takeshi Aoyagi, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 999 days.

(21) Appl. No.: 10/990,680

(22) Filed: Nov. 18, 2004

(65) Prior Publication Data
US 2005/0127135 A1 Jun. 16, 2005

(30) Foreign Application Priority Data
Nov. 28, 2003 (JP) ............... 2003-399660

(51) Int. Cl.
*F23D 11/36* (2006.01)
(52) U.S. Cl. ......................... 431/343; 429/26
(58) Field of Classification Search ................ 431/343, 431/344; 60/796, 303, 800; 126/91 A; 181/227; 138/106, 107; 248/219.1, 58; 429/26
See application file for complete search history.

(56) References Cited

U.S. PATENT DOCUMENTS

| | | | |
|---|---|---|---|
| 1,703,605 A * | 2/1929 | Ballantyne | .................. 138/106 |
| 2,863,474 A | 12/1958 | Whitehead | |
| 3,399,545 A | 9/1968 | Anderson et al. | |
| 4,323,088 A * | 4/1982 | McClellan | .................. 138/106 |
| 4,654,612 A * | 3/1987 | Smith | ......................... 333/248 |
| 5,906,093 A * | 5/1999 | Coslow et al. | ................ 60/777 |
| 6,425,417 B1 * | 7/2002 | Paschke | ....................... 138/107 |
| 6,427,727 B1 * | 8/2002 | Thomas | ....................... 138/106 |
| 6,523,352 B1 * | 2/2003 | Takahashi et al. | ............. 60/796 |
| 6,623,044 B1 * | 9/2003 | Guesnon et al. | .......... 285/124.1 |
| 2002/0166720 A1 * | 11/2002 | Kusabiraki et al. | .......... 181/240 |
| 2004/0055311 A1 * | 3/2004 | Swinford et al. | .............. 60/796 |
| 2005/0079467 A1 * | 4/2005 | Yamada | ...................... 431/343 |

FOREIGN PATENT DOCUMENTS

| | | |
|---|---|---|
| GB | 502776 | 3/1939 |
| JP | 11-336611 A | 12/1999 |

* cited by examiner

*Primary Examiner*—Kenneth B Rinehart
*Assistant Examiner*—Daniel A Bernstein
(74) *Attorney, Agent, or Firm*—Foley & Lardner LLP

(57) ABSTRACT

A support structure of the present invention includes a fixation member directly or indirectly heated, a supported object supported by the fixation member, and a sliding member provided on an outer periphery of the fixation member, the sliding member being slidable in a longitudinal direction of the fixation member. In the support structure, one fixation part of the supported object is fixed to the fixation member and another fixation part of the supported object is fixed to the sliding member. By this structure, it is possible to avoid concentration of stress and to surely support the supported object to the thermally expanding fixation member.

11 Claims, 4 Drawing Sheets

SUPPORT STRUCTURE

BACKGROUND OF THE INVENTION

1. Field of the Invention

The present invention relates to a structure for supporting a supported object onto a thermally expanding fixation member.

2. Description of the Related Art

As circular disclosed in Japanese Patent Application Laid-Open No. H11-336611, there is a conventional support structure configured to support a supported object so as to follow deformation of a thermally expanding fixation member. The conventional support structure applies flexible supporting rods in order to follow the thermal expansion of the fixation member. In this support structure, two supporting rods are decussated and ends of the respective supporting rods are fixed to the fixation member. In addition, the supported object is fixed at four points to a decussated portion formed by the two supporting rods. An intersection of the two decussated supporting rods is welded together.

SUMMARY OF THE INVENTION

However, the conventional support structure can permit the thermal expansion of the fixation member only in an elastically deformable range of the supporting rods. In particular, since stress is concentrated on the fixation points of the supporting rods to the fixation member and on the intersection of the two supporting rods, the support structure cannot permit large thermal expansion.

The present invention has been made in consideration of the foregoing problem. An object of the present invention is to provide a support structure, which is configured to avoid concentration of stress and to surely support a supported object to a thermally expanding fixation member.

According to one aspect of the present invention, there is provided a support structure comprising: a fixation member directly or indirectly heated; a supported object supported by the fixation member; and a sliding member provided on an outer periphery of the fixation member, the sliding member being slidable in a longitudinal direction of the fixation member, wherein one fixation part of the supported object is fixed to the fixation member and another fixation part of the supported object is fixed to the sliding member.

BRIEF DESCRIPTION OF THE DRAWINGS

The invention will now be described with reference to the accompanying drawings wherein.

DETAILED DESCRIPTION OF THE PREFERRED EMBODIMENT

The following embodiment represents an application of a support structure of the present invention to a structure for supporting a pipe onto a combustor. Now, an embodiment of a support structure of the present invention will be described with reference to the accompanying drawings.

Figure 1:
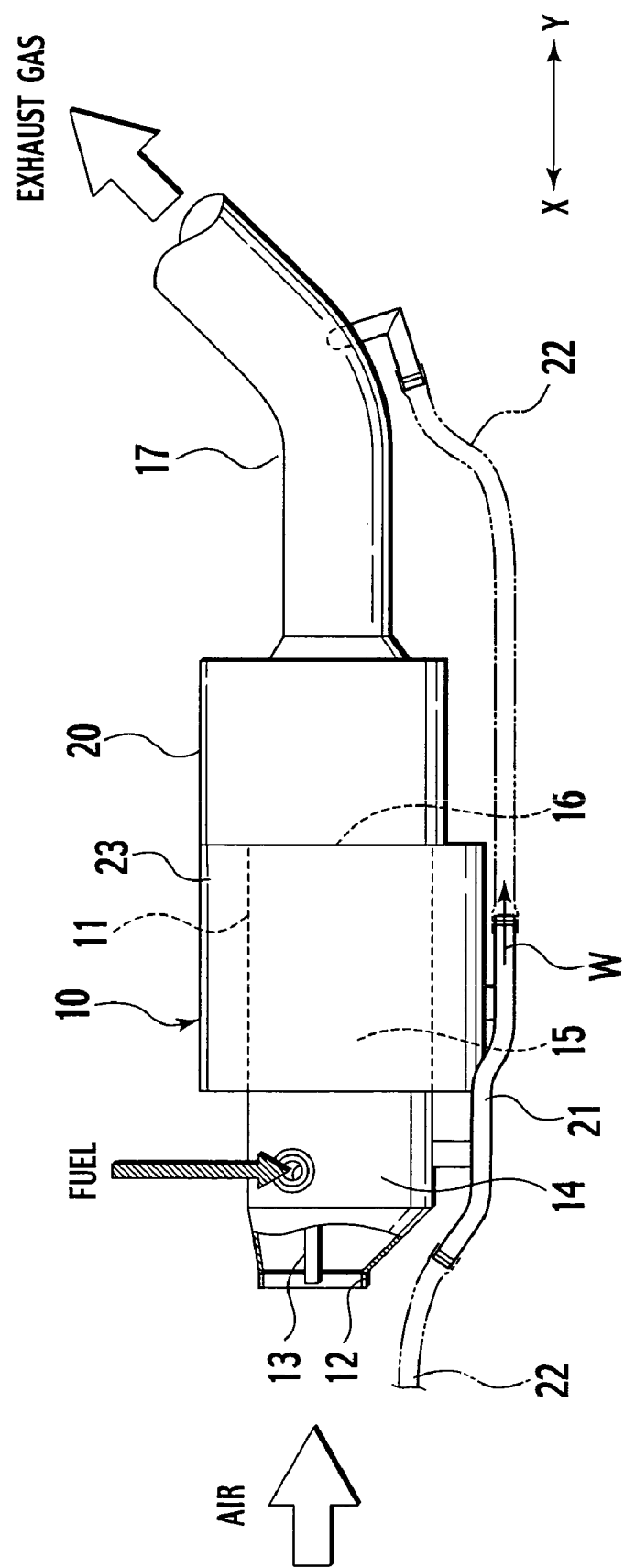
FIG. 1 is a plan view of a combustor including a support structure of the present invention.
Figure 2:
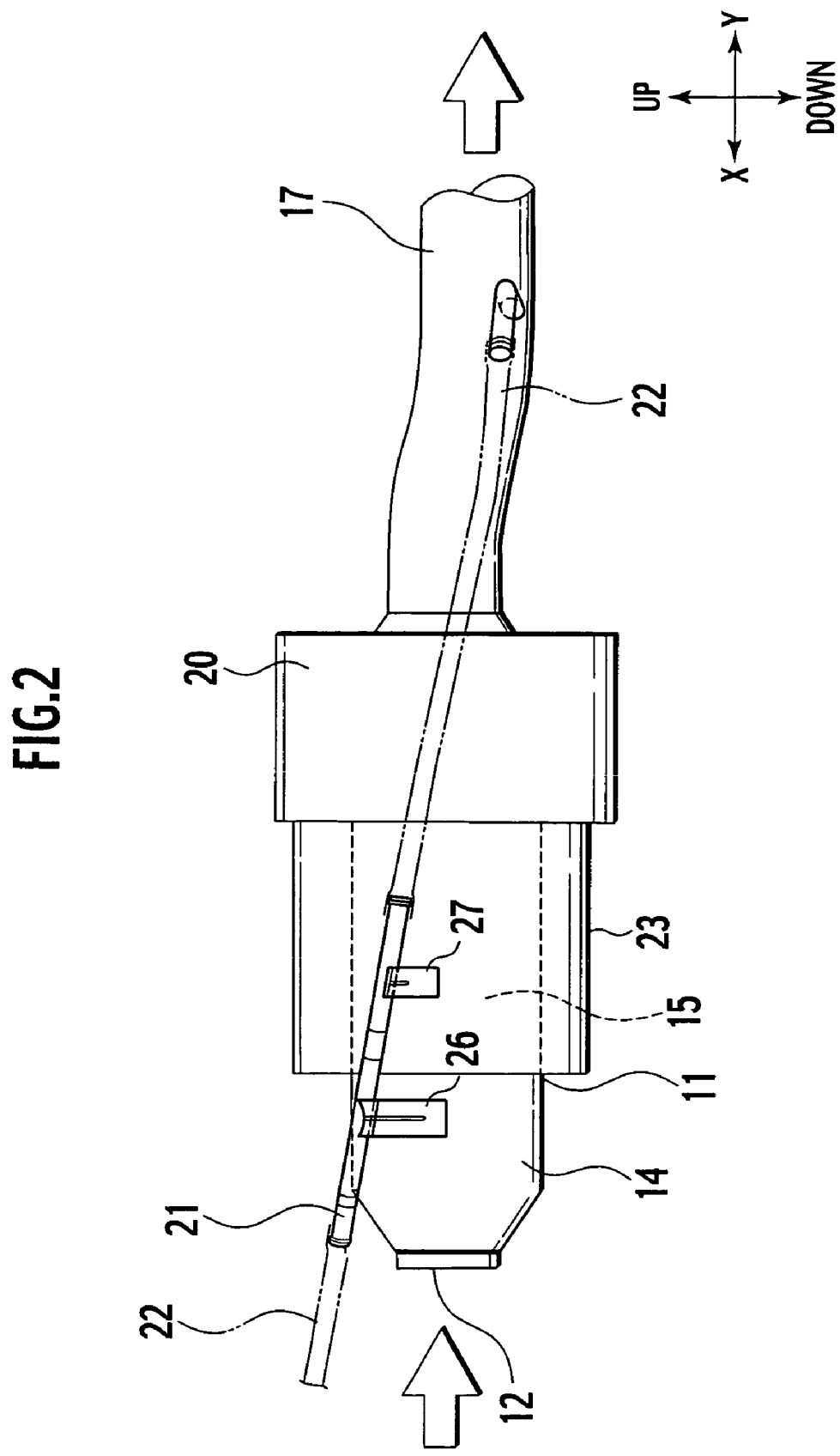
FIG. 2 is a side view of the combustor including the support structure of the present invention.

First of all, a basic structure of a combustor will be described. A combustor 10 shown in FIGS. 1 and 2 is used for a fuel cell system in a fuel-cell vehicle. The combustor 10 is configured to process hydrogen (fuel) contained in anode off-gas circular discharged from an anode of a fuel cell, or more particularly, to mix hydrogen with air and thereby to combust the mixed gas. Here, cathode off-gas circular discharged from a cathode of the fuel cell can be used as the air to be mixed in a combustion chamber. In addition, when the fuel cell system is started at low temperature, the combustor 10 is configured to combust hydrogen and thereby to generate heat when necessary to heat a fuel cell stack to appropriate operating temperature.

As shown in FIGS. 1 and 2, the combustor 10 includes a casing 11, a fuel supply unit 13, a mixing chamber 14, and a combustion chamber 15. The casing 11 is formed into a tubular shape and includes an air intake 12 and an exhaust outlet 16, thereby forming a ventilation flue inside. The fuel supply unit 13 is disposed in the vicinity of the air intake 12 of the casing 11, and injects the fuel into the mixing chamber 14. The mixing chamber 14 is provided on an upstream side in the casing 11, and is configured to mix the air and the fuel uniformly. The combustion chamber 15 is provided on a downstream side of the mixing chamber 14 in the casing 11, and is configured to combust the mixed gas of the air and the fuel. Meanwhile, a heat exchanger 20 is provided on a downstream side of the combustor 10, and is configured to take out the heat of the combustion gas generated in the combustor 10 when the combustion gas passes therethrough. In addition, an exhaust pipe 17 is provided on a downstream side of the heat exchanger 20, and is configured to guide the combustion gas to a given exhaust position.

When the fuel cell system is in operation, the cathode off-gas (the air) circular discharged from the cathode of the stack is supplied from the air intake 12 into the combustor 10. Thereafter, when hydrogen is supplied from a fuel supply device through the fuel supply unit 13 or when the anode off-gas containing hydrogen is circular discharged from the anode of the fuel cell, the combustor 10 combusts the mixed gas of the air and hydrogen, and then the combustion gas is circular discharged from the exhaust pipe 17.

A pipe 21 configured to guide waste water W, which is circular discharged from other devices in the fuel cell system to the exhaust pipe 17, is fixed to the combustor 10. Deformable hoses 22 such as rubber hoses are connected to upstream and downstream sides of this pipe 21, and the pipe 21 and the hoses 22 collectively constitute a drainage path. Meanwhile, in order to facilitate flow of a fluid inside the pipe 21, the pipe 21 is arranged as a downslope toward a downstream side in terms of the moving direction of the fluid (see FIG. 2).

Figure 3:
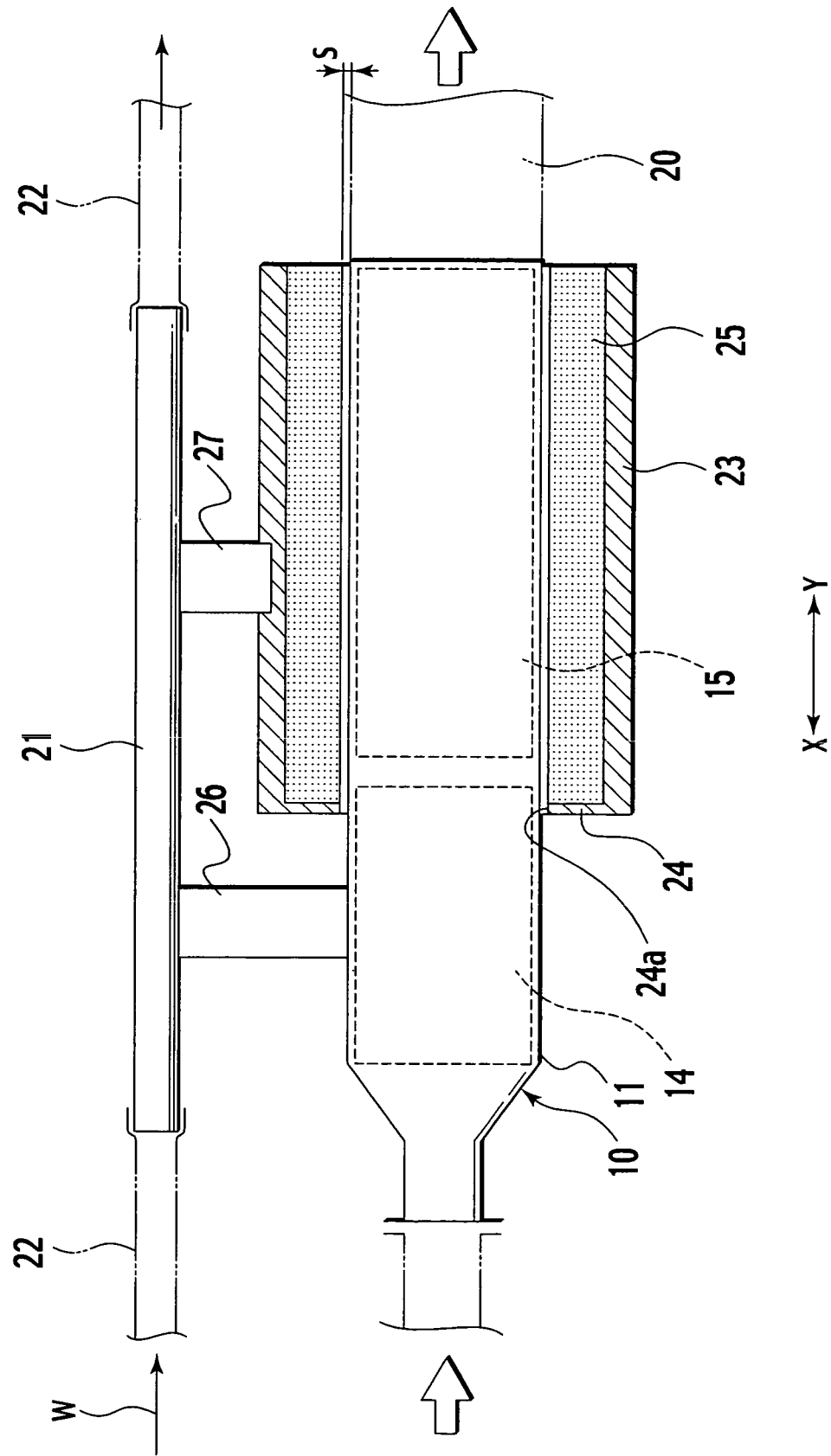
FIG. 3 is a view schematically showing a support structure for a pipe.
Figure 4:
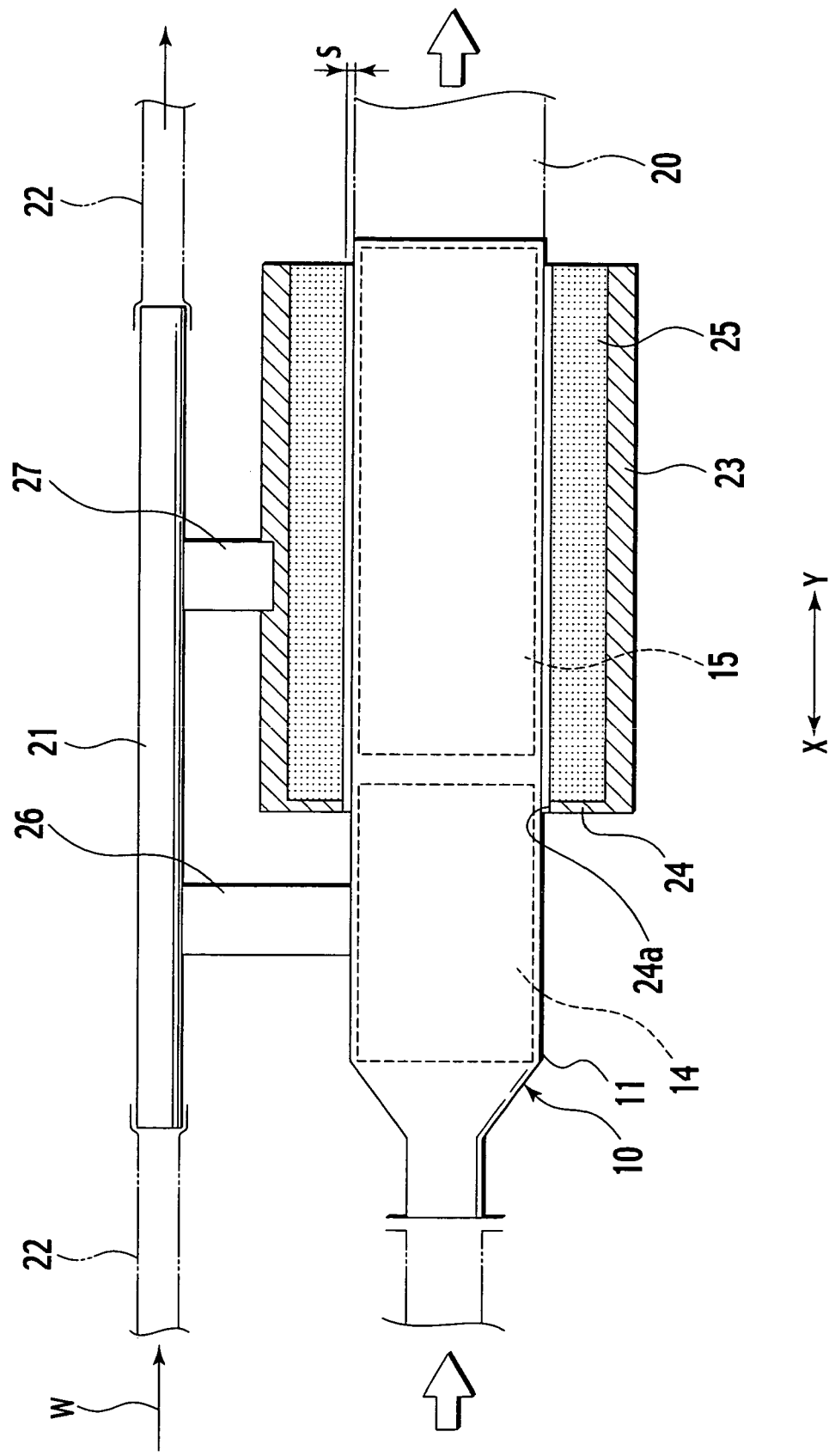
FIG. 4 is a comparative view to FIG. 3 showing an expanded state of the combustor.

Now, the support structure for the pipe 21 onto the combustor 10 will be described in detail with reference to FIGS. 3 and 4. Here, the combustor 10 corresponds to the fixation member of the present invention, and the pipe 21 corresponds to the supported object of the present invention. A tubular sliding member 23 is fitted to an outer periphery of the tubular casing 11 of the combustor 10. The sliding member 23 covers the major part of the region corresponding to the combustion chamber 15. A heat insulating material 25 is provided between the sliding member 23 and the combustor 10. The heat insulating material 25 is integrally formed on an inner peripheral surface of the sliding member 23.

The tubular sliding member 23 includes a circular plate 24 on one end, which is disposed around an outer peripheral surface of the tubular casing 11. A through hole 24a of the circular plate 24 is not fixed to the casing 11. In this way, the sliding member 23 is slidable in the longitudinal direction (the XY direction in the drawing) of the casing 11, and movement other than the longitudinal direction is restricted. Note that a clearance S between the casing 11 and the sliding member 23 is exaggerated in FIGS. 3 and 4. In fact, the clearance S is regulated to an adequate degree to permit thermal expansion of the casing 11 while avoiding the sliding member 23 from shaking in the diametrical direction thereof.

The pipe 21 includes two brackets 26 and 27. The bracket 26 is fixed to the outer peripheral surface of the casing 11 of the combustor 10, and the bracket 27 is fixed to an outer peripheral surface of the sliding member 23. The bracket 26 subject to fixation to the combustor 10 is fixed to a region corresponding to the mixing chamber 14 of the combustor 10. Here, both of the brackets 26 and 27 are fixed by welding.

Now, operations and effects of this embodiment will be described below.

First, in this embodiment, the sliding member 23 which is slidable in the longitudinal direction of the combustor 10 (the XY direction) is provided around the combustor 10. Meanwhile, the bracket 26 of the pipe 21 is fixed to the combustor 10, and the bracket 27 is fixed to the sliding member 23. In this way, even when the combustor 10 expands in the longitudinal direction due to thermal expansion as shown in FIG. 4, it is possible to absorb stress on the pipe 21 attributable to the thermal expansion and thereby to surely support the pipe 21 onto the combustor 10 because the sliding member 23 is movable in the longitudinal direction. Moreover, in the support structure of this embodiment, one of the brackets provided on the pipe 21 is fixed to the combustor 10. Accordingly, the support structure has an advantage of higher supporting strength as compared to a structure to fix the pipe 21 only to the sliding member 23.

Second, in this embodiment, the sliding member 23 is formed into a tubular shape so as to cover at least a part of the combustor 10. Accordingly, it is possible to prevent damages on components around the combustor 10 due to the heat thereof.

Third, in this embodiment, the heat insulating material 25 is disposed between the sliding member 23 and the combustor 10. Accordingly, it is possible to prevent deterioration of material strength of the sliding member 23 caused by continual exposure to high temperature, and thereby to improve durability thereof. Moreover, since the heat insulating material 25 is integrally formed on the sliding member 23, the rigidity of the sliding member 23 is enhanced.

Fourth, in this embodiment, the combustor 10 per se is configured to generate high-temperature heat. Accordingly, the operation of absorption of the thermal expansion by the sliding member 23 becomes more effective as compared to a case of heating the fixation member indirectly.

Fifth, in this embodiment, the fixation member is the combustor 10, and the combustor 10 includes the mixing chamber 14 for mixing the fuel and the air, and the combustion chamber 15 for combusting the gas mixed in the mixing chamber 14. Here, the bracket 26 is provided in the region corresponding to the mixing chamber 14 of the combustor 10. Accordingly, in contrast to a case of providing the bracket 26 in a region corresponding to the combustion chamber 15 of the combustor 10, it is possible to avoid deterioration of bonding strength caused by continual heating of the bracket 26 to high temperature.

Sixth, this embodiment adopts the structure configured to hold the supported object at two points provided with a certain distance (the brackets 26 and 27). Accordingly, the support structure can surely support a long object, such as a pipe, as the supported object 21.

Seventh, in this embodiment, the pipe 21 is formed into a downslope in order to facilitate the movement of the fluid W. Accordingly, the fluid W can flow smoothly to the downstream side.

As described above, the present invention provides the support structure including the sliding member which is provided on the fixation member as slidable in the longitudinal direction of the fixation member. In addition, one of fixation parts of the supported object is fixed to the fixation member and the other fixation part of the supported object is fixed to the sliding member. It should be noted, however, that the present invention is not limited only to the above-described aspect. To be more precise, in this embodiment, the fixation part is connected to the combustor which generates high-temperature heat by itself. However, similar operations and effects can be obtained by applying the support structure of the present invention to a fixation member which is indirectly heated.

The entire content of a Japanese Patent Application No. P2003-399660 with a filing date of Nov. 27, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A support structure, comprising:
   a combustor including:
      a mixing chamber which mixes fuel and air; and
      a combustion chamber which combusts the fuel and the air mixed in the mixing chamber;
   a supported object supported by the combustor;
   a sliding member provided around at least a part of an outer periphery of the combustion chamber of the combustor, the sliding member being slidable in a longitudinal direction of the combustor; and
   a heat insulating material provided on an inner periphery of the sliding member, the heat insulating material being slidable with the sliding member in the longitudinal direction of the combustor,
   wherein a first fixation part of the supported object is fixed to the combustor and a second fixation part of the supported object is fixed to the sliding member, and
   the first fixation part of the supported object supported by the combustor is provided adjacent to the mixing chamber of the combustor.

2. The support structure according to claim 1,
   wherein the sliding member is formed into a tubular shape in order to cover at least a part of the combustor.

3. The support structure according to claim 1, wherein the heat insulating material is integrally formed on the inner periphery of the sliding member.

4. The support structure according to claim 1,
   wherein the supported object is a long object.

5. The support structure according to claim 4,
   wherein the supported object is a pipe, and
   wherein the pipe is arranged as a downslope toward a downstream side in a moving direction of a fluid flowing inside the pipe.

6. The support structure of claim 1, wherein the support structure is of an open-frame configuration.

7. The support structure according to claim 1,
   wherein the combustor is configured to process hydrogen fuel discharged from a fuel cell.

8. The support structure according to claim 1,
wherein the supported object is a pipe,
wherein the pipe is adapted to guide waste water discharged from a fuel cell system, and
wherein the combustor is configured to process hydrogen fuel.

9. The support structure according to claim 1,
wherein the supported object is a pipe,
wherein the pipe is adapted to guide waste water discharged from a fuel cell system, and
wherein deformable hoses are attached to a first end and a second end of the pipe.

10. The support structure of claim 1, wherein the supported object is a pipe through which a fluid flows, and wherein the pipe directs the fluid flow through the pipe in a general direction that is not substantially parallel to a general direction that the combustor directs a fluid flow through the combustor.

11. The support structure of claim 10, wherein the pipe is adapted to guide waste water discharged from a fuel cell system, and wherein deformable hoses are attached to a first end and a second end of the pipe.

* * * * *